Figure 1:
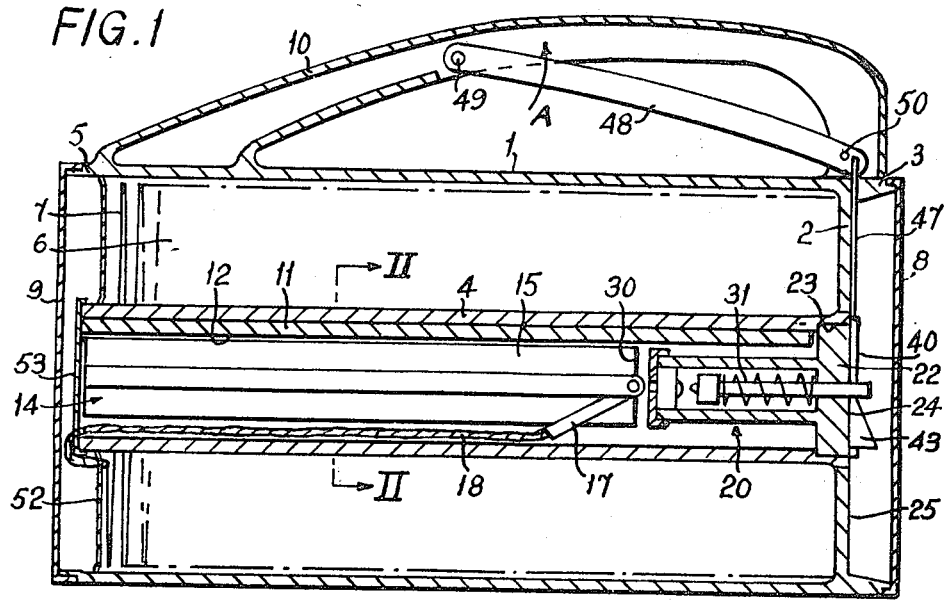

United States Patent [19]
Taylor

[11] 3,901,157
[45] Aug. 26, 1975

[54] LINE THROWING EQUIPMENT

[75] Inventor: Leonard Taylor, Surrey, England

[73] Assignee: Schermuly Limited, Surrey, England

[22] Filed: Aug. 31, 1973

[21] Appl. No.: 393,680

Related U.S. Application Data

[63] Continuation of Ser. No. 194,863, Nov. 2, 1971, abandoned.

[30] Foreign Application Priority Data
Nov. 11, 1970   United Kingdom............... 53605/70

[52] U.S. Cl.................................... 102/89; 89/1 G
[51] Int. Cl............................................ F42b 13/56
[58] Field of Search.................... 89/1 G, 1 B, 1.816

[56] References Cited
UNITED STATES PATENTS

| | | | |
|---|---|---|---|
| 2,454,528 | 11/1948 | Temple | 89/1 B |
| 2,458,476 | 1/1949 | Lauritsen et al. | 89/1.816 |
| 2,478,774 | 8/1949 | Meinel | 89/1.819 |
| 2,736,236 | 2/1956 | Martin | 89/1 B |
| 2,817,272 | 12/1957 | Gunder | 89/1.816 X |
| 2,876,702 | 3/1959 | Wheelwright et al. | 102/89 |
| 3,386,334 | 6/1968 | Temple et al. | 89/1 B |
| 3,619,927 | 11/1971 | Robenet | 89/1 B X |
| 3,665,630 | 5/1972 | Taylor | 89/1 B |

FOREIGN PATENTS OR APPLICATIONS
899,975   6/1962   United Kingdom.................. 89/1 G

*Primary Examiner*—Samuel Feinberg
*Assistant Examiner*—Harold Tudor
*Attorney, Agent, or Firm*—Michael S. Striker

[57] ABSTRACT

In a line-throwing equipment of the kind comprising an elongate housing, a rocket discharger tube mounted within the housing substantially coaxially with the housing, and a line housed in a space between the internal surface of the housing and the external surface of said discharger tube, three or more elongate guide rails are disposed within, and fixed relative to, the generatrix of an imaginary circular cylindrical surface having its axis substantially parallel to the axis of the discharger tube, the guiding surfaces being spaced at equal or substantially equal angular intervals around said imaginary cylindrical surface. The guide rails, which may be in the form of straight strips of rectangular cross-section, may be welded or brazed to the internal surface of said discharger tube, or they may be formed integrally with the latter.

13 Claims, 5 Drawing Figures

PATENTED AUG 26 1975  3,901,157

Attorney

LINE THROWING EQUIPMENT

This is a continuation of application Ser. No. 194,863 filed Nov. 2, 1971, now abandoned.

This invention relates to an improved line-throwing equipment comprising a housing which accommodates a rocket discharger tube and a line.

Self-contained line-throwing equipment is known in which an annular container for a line is disposed coaxially around a discharger barrel from which a line-throwing rocket can be discharged. The bridle of the rocket is attached to the line so that when the rocket is fired from the barrel the line is drawn out of the annular container.

In the known line-throwing equipment it has always proved a difficult matter to achieve a satisfactory connection between the free end of the line, which is located in the annular container at the end of the latter adjacent to the open end of the barrel, and the rear end of the line attachment bridle which, immediately prior to firing of the rocket is disposed near the closed end of the barrel. The reason for this is that the connecting means, for example a length of rope, between the line and the rocket bridle has to be accommodated in the confined space bwtween the external surface of the rocket casing and the internal surface of the wall of the discharger barrel, or else the latter has to be provided with a longitudinal groove to accommodate the connecting means.

The present invention aims to provide an improved line-throwing equipment which facilitates connection of the line to the rocket.

According to the invention, a line-throwing equipment comprising an elongate housing, a rocket discharger tube mounted within the housing substantially coaxially with the housing, and a line housed in a space between the internal surface of the housing and the external surface of said discharger tube, is characterised by three or more elongate guide rails disposed within, and fixed relative to, the discharger tube and each having a guiding surface located on a different generatrix of an imaginary circular cylindrical surface having its axis substantially parallel to the axis of the discharger tube, the guiding surfaces being spaced at equal or substantially equal angular intervals around said imaginary cylindrical surface.

Preferably there are three guide rails and the guide rails may be in the form of straight strips of rectangular cross-section, made of metal or plastics material.

The guide rails may be welded or brazed to the internal surface of the discharger tube, the latter then being made of metal, or the discharger tube may be an extruded product with said guide rails forming part of the extruded section. Both the housing and the discharger tube may be of circular cross-section and may form the outer and inner walls, respectively of a container of annular cross-section which houses said line. In this case the line is flaked into the annular container in layers from one end of the container, both ends of the flaked line being left free at or adjacent to the other end of the annular container.

In use of the equipment in accordance with the invention a line-throwing rocket has its bridle connected to the free end of the line by any suitable connecting means, for example a length of rope, and the rocket is entered into the cylindrical space defined by said imaginary cylindrical surface, the rocket being entered into said space, choke end first, from the end of the guide rails disposed adjacent to the free end of the line. The line connecting means and parts of the rocket bridle which extend radially beyond the confines of the rocket casing are readily accommodated in the spaces lying between adjacent guide rails outside said imaginary cylindrical surface.

Line-throwing equipment of the kind with which this invention is concerned is usually provided with a percussion igniter mechanism which serves to ignite the propellant charge of a rocket placed in the discharger. Such a percussion igniter mechanism is suitably secured to the housing of the equipment with the percussion igniter located in such a position that, when the igniter is initiated, the flash therefrom is able to ignite the propellant charge of a rocket disposed in the discharger tube. A suitable trigger mechanism for actuating the igniter mechanism may also be mounted on the housing.

Figure 2:
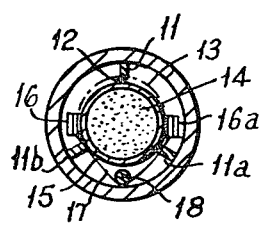
Figure 3:
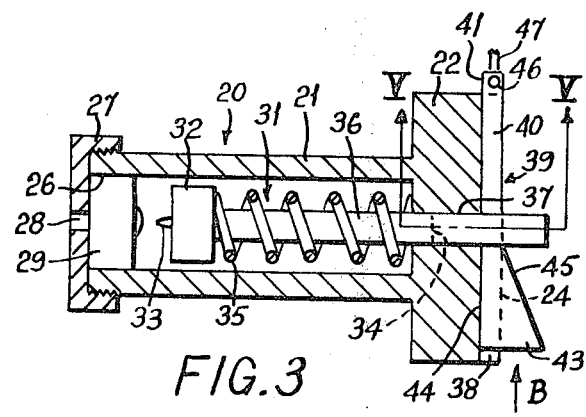
Figure 5:
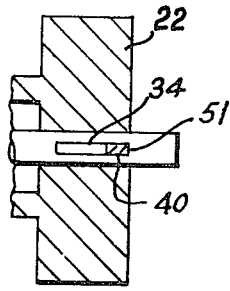
Figure 4:
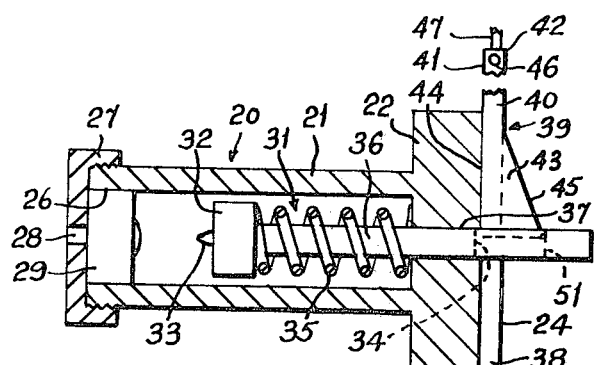

The invention will now be described in greater detail, by way of example, with reference to the accompanying drawing, in which FIG. 1 is a sectional elevation of a line-throwing equipment in accordance with the invention, FIG. 2 is a sectional view taken on the line II—II of FIG. 1, FIG. 3 is a sectional elevation, on an enlarged scale, of the percussion igniter mechanism of the equipment of FIG. 1, showing the parts in the position they adopt during storage of the equipment, FIG. 4 is a view similar to FIG. 3, but showing the parts in the position they adopt immediately prior to initiation of the percussion igniter, and FIG. 5 is a section taken along the line V—V of FIG. 3.

The line-throwing equipment shown in FIGS. 1 and 2 comprises a housing formed by a tube 1 of circular cross-section, made, for example, of a plastics material, and having an annular plate 2 adjacent one end 3. The plate 2 may be moulded integrally with the tube 1.

Coaxially disposed within the tube 1 is a second tube 4 of circular cross-section which extends from the annular plate 2 almost to the end of the tube 1. The tube 4 may be made of any suitable material, for example metal or plastics material, and the annular space 6 between the tubes 1 and 4 is occupied by a line 7 which is flaked into the space 6 starting at the annular plate 2 and proceeding in the direction towards the end 5 of the tube 1. Both ends of the line, hereinafter referred to as the rocket end of the line and the loop end of the line, respectively, are brought to the end 5 of the tube 1. Removable end caps 8, 9 of transparent plastics material are fitted over the ends 3, 5, respectively, of the tube 1.

On the external surface of the tube 1, for example moulded integrally with the tube 1, is a handle 10 by means of which the equipment is held during use.

Projecting radially inwardly from the internal surface of the tube 4 are three longitudinally disposed guide rails 11, 11a and 11b. Each of these rails has an inwardly facing guiding surface 12 located on a different generatrix of an imaginary circular cylindrical surface, indicated by the chain line 13 in FIG. 2, this imaginary cylindrical surface having its axis substantially coincident with the axis of the tube 4. The rails 11, 11a and 11b are preferably strips of rectangular cross-section and they may be made of any suitable material, for example metal or plastics material. These rails may be fixed to the tube 4 in any suitable manner, for example welded, brazed, riveted or screwed. Alternatively, the tube 4 and the rails may be formed integrally with one another.

Housed within the tube 4 is a line-carrying rocket 14 having a casing 15 of circular cross-section. The rocket has a conventional bridle consisting of rods 16, 16a secured to the casing 15 and a stirrup 17 pivoted to the rearward ends of the rods 16, 16a. A connecting member 18, for example a length of rope, joins the stirrup 17 to the rocket end of the line 7 located near the end 5 of the tube 1.

As can be seen from FIG. 2, the casing 15 of the rocket 14 is disposed in the tube 4 within the imaginary cylinder defined by the line 13. The bridle rods 16, 16a are located in the annular space between the internal surface of the tube 4 and the imaginary cylindrical surface defined by the line 13, and rod 16 being located between the rails 11 and 11b and the rod 16a being between the rails 11 and 11a. The stirrup 17 rests on the guiding surfaces 12 of the rails 11a, 11b and the connecting member 18, throughout most of its length, lies in the space between the rails 11a and 11b.

The end of the tube 4 adjacent to the annular plate 2 is closed by a percussion igniter mechanism generally designated by the reference numeral 20. The latter comprises a tubular housing 21 having an apertured circular plate 22 at one end, the plate 22 being let into a counterbored portion 23 of the tube 4. In the case illustrated the outwardly-facing surface 24 of the plate 22 is flush with the outwardly-facing surface 25 of the annular plate 2, but the surface 24 may stand proud of the surface 25 to facilitate removal of the mechanism 20. As will be seen most clearly from FIGS. 3 and 4, the end 26 of the tubular housing 21 is closed by a cap 27 having a central aperture 28 therein and a percussion igniter 29 is mounted in the housing 21 adjacent to the cap 27. As can be seen from FIG. 1, the apertured cap 27 is located closely adjacent to the choke end 30 of the rocket 14.

Within the housing 21 is a striker 31 having, at one end, an enlarged head 32 provided with a firing tip 33. Adjacent its other end the striker has a slot 34 extending therethrough. A helical spring 35 surrounds the striker shank 36 and bears at one end on the head 32 and at the other end on the plate 22.

The plate 22 has a central aperture 37 formed therein and a diametral groove 38 formed in its outwardly-facing surface 24. The slotted end of the striker 31 projects through the aperture 37 and a keeper member, generally designated by the reference numeral 39, which is slidably mounted in the groove 38, passes through the slot 34 in the striker.

The keeper member 39 is made from strip material and has a first portion 40 with parallel side edges 41 and 42. Integrally formed with the first portion 40 is a second portion 43 having side edges 44 and 45 which are inclined towards each other in the direction towards the junction between the portions 40 and 43, the side edges 41 and 44 being aligned with one another. At its free end the portion 40 has a hole 46 which receives the bent end of a rod 47. At its end remote from the keeper member the rod 47 is pivotally connected to a firing lever 48 which is itself pivoted at 49 to the handle 10.

FIGS. 1 and 3 show the parts of the line-throwing equipment in the positions they occupy during storage of the equipment. In this condition of the equipment a safety pin 50 can be passed through aligned holes in the firing lever 48 and the handle 10 to prevent actuation of the firing lever 48. With the firing lever in this safety position the keeper member 39 has its portion 40 engaged in the striker slot 34 with the side edge 42 engaging the end 51 of the slot 34. The firing tip 33 of the striker is held close, but in safe relationship, to the igniter 29 and the spring 35 is only under light tension.

When the equipment is to be used, the end cap 9 is removed from the tube 1, and the loop end of the line 7 is secured to a coil of heavy rope or to a static or heavy object, for example a ship's rail. The pin 50 is then removed and the firing lever 48 is pivoted around the pivot 49 in the direction of the arrow A. This has the effect of moving the keeper member in the direction of the arrow B (see FIG. 3) and FIG. 4 shows the positions of the parts of the igniter mechanism immediately prior to firing of the igniter 29. In this Figure it will be seen that the portion 43 of the striker has almost moved through the striker slot 34 with the result that the side edge 45 acting as a cam surface on the end 51 of the slot 34 has moved the striker 31 to the right, compared with FIG. 3, to stress the spring 35. Further movement of the keeper member in the direction of the arrow B causes the portion 43 to move out of the slot 34 so that the spring 35 can re-assert itself and drive the striker to the left, as viewed in FIGS. 3 and 4, so that the firing tip 33 is driven against the igniter 29. A flash from the igniter 29 passes through the aperture 28 into the choke end 30 of the rocket 14 so that the propellant charge of the latter is ignited. The rocket then travels out of the tube 4, guided by the guiding surfaces 12. As the rocket moves along the tube 4 the rods 16, 16a and the connecting member 18 have ample space in which to move without impeding the progress of the rocket, and the tube 4 prevents the rods of the bundle from becoming entangled with the line 7 and also prevents the propellant gases from damaging the line. Furthermore, the annular space between the internal wall of the tube 4 and the external surface of the rocket casing 15 allows the propellant gases to escape forwards, thus serving to reduce recoil forces on the equipment.

In order to avoid any danger of the rocket and line falling out of the housing when the cap 9 is removed, the annular space 6 may be closed by a thin paper or plastic membrane 52 and the tube 4 may be closed by a thin end cap 53. The cap 53 is ruptured by the rocket as it emerges from the tube 4 and the membrane 52 is ruptured by the line 7 as it is drawn from the space 6.

Both the rocket 14 and the igniter mechanism 20 are readily removable for replacement, for example when it is considered that the propellant charge of the rocket and the igniter 29 may have deteriorated during storage. Both the rocket and the igniter mechanism may be stamped with the dates when it is advisable to replace them, which dates can be viewed through the transparent caps 8 and 9.

What is claimed is:

1. Line-throwing equipment, comprising an elongate housing; a rocket discharge tube mounted in said housing with its axis substantially parallel to the axis of said housing and defining a radial gap between said tube and said housing, said discharge tube having an open front end and a closed rear end and including at least three elongate interior guide rails extending in a direction substantially parallel to the axis of said discharge tube, said guide rails being fixed relative to said discharge tube and each of said guide rails having a guiding surface located on a different generatrix of an imaginary cylindrical surface having an axis substantially parallel to that of said discharge tube, said guiding surfaces being located at spaced intervals about said imaginary surface; an unarmed percussion igniter mechanism mounted in said discharge tube at said closed rear end thereof, said igniter mechanism including means for arming the same; a rocket interiorly of said discharge tube accommodated within the confines of said guiding surfaces for guidance by the latter, said rocket having an end portion adjacent said igniter mechanism for ignition by the latter; a line in said radial gap; and connecting means for connecting an end of said line to said rocket in the region of said end portion thereof, said connecting means being accommodated at least in part between two of said guide rails and having a pivotable stirrup forwardly disposed while said rocket is within said tube and a connecting member attached to a forward end of said stirrup so that the heat of ignition will not affect the connection between said connecting member and said stirrup, whereby ignition of said rocket by said igniter mechanism results in the expulsion of said rocket and in the symmetrical escape of the developing hot gases through said open front end, so that the possibility of injury to a user as a result of contact with the escaping hot gases is at least minimized and, due to the symmetrical escape of such gases, interference by said gases with the flight accuracy of the rocket is prevented.

2. Line-throwing equipment as defined in claim 1, said igniter mechanism comprising a plate provided with an aperture and constituting the closure means for said closed end of said discharge tube, a percussion igniter fixed relative to and longitudinally spaced from said plate, an elongated striker extending longitudinally of said discharge tube and including a firing tip adjacent said igniter and an end portion spaced from said firing tip and extending through said aperture, biasing means engaging said striker and being substantially unstressed when said igniter mechanism is unarmed, said biasing means being arranged to urge said striker towards said igniter when stressed, and a keeper member slidably mounted in the region of said end portion of said striker and having a first position in which it engages said end portion of said striker so as to prevent movement of the latter towards said igniter, said keeper member also having a second position in which it is free of engagement with said end portion of said striker so as to permit movement of the latter towards said igniter; and wherein said means for arming said igniter mechanism comprises cooperating cam surfaces provided on said keeper member and said end portion of said striker, said cooperating cam surfaces being arranged in such a manner that when said keeper member is in said first position said biasing means is substantially unstressed, and when said keeper member is moved from said first position towards said second position said striker is displaced away from said igniter thereby stressing said biasing means so that when said keeper member reaches said second position said striker is urged towards said igniter.

3. Line-throwing equipment as defined in claim 2, and further comprising a tubular member interiorly of said discharge tube and having two longitudinally spaced ends, said plate closing one of said ends of said tubular member, and said igniter being mounted at the other of said ends of said tubular member, said striker being located interiorly of said tubular member and extending longitudinally thereof.

4. Line-throwing equipment as defined in claim 3, said striker having an enlarged head longitudinally spaced from said end portion thereof, and said firing tip being mounted on said head; and wherein said biasing means comprises a helical spring interiorly of said tubular member and surrounding said striker, said spring being arranged to bear against said head and react against said plate.

5. Line-throwing equipment as defined in claim 2, said plate having a surface facing away from said igniter and provided with a diametral groove, and said end portion of said striker being provided with a slot extending therethrough and longitudinally thereof, said slot having an end remote from said firing tip; and wherein said keeper member is a metal strip mounted in said groove for sliding movement through said slot, said strip having a cam surface which engages said end of said slot when said keeper member is in said first position.

6. Line-throwing equipment as defined in claim 2, and further comprising a trigger mechanism mounted on said housing and connected with said keeper member, said trigger mechanism being effective for moving said keeper member from said first position to said second position.

7. Line-throwing equipment as defined in claim 1, wherein said end of said line is connected with said connecting member.

8. Line-throwing equipment as defined in claim 1, wherein said guide rails comprise substantially straight strips of substantially rectangular cross-section.

9. Line-throwing equipment as defined in claim 1, wherein said discharge tube is of substantially circular cross-section.

10. Line-throwing equipment as defined in claim 9, wherein said housing is of substantially circular cross-section.

11. Line-throwing equipment as defined in claim 1, wherein said discharge tube is extruded and said guide rails are integral therewith.

12. Line-throwing equipment as defined in claim 1, said radial gap having longitudinally spaced ends, and said line having another free end; and wherein said line is flaked into said radial gap from one of said ends of the latter, said free ends being located at the other of said ends of said radial gap.

13. Line-throwing equipment as defined in claim 1 wherein said connecting means further comprises two rods, one attached to each side of said rocket running axially from the nose end to the rear end of the rocket, said rods being inside of the discharge tube.

* * * * *